US010583424B2

(12) United States Patent
Bull et al.

(10) Patent No.: US 10,583,424 B2
(45) Date of Patent: Mar. 10, 2020

(54) CHABAZITE ZEOLITE CATALYSTS HAVING LOW SILICA TO ALUMINA RATIOS (75) Inventors: Ivor Bull, Ludwigshafen (DE); Ahmad Moini, Princeton, NJ (US); Mukta Rai, Marlboro, NJ (US)

(73) Assignee: BASF Corporation, Florham Park, NJ (US)

( * ) Notice: Subject to any disclaimer, the term of this patent is extended or adjusted under 35 U.S.C. 154(b) by 112 days.

(21) Appl. No.: 12/612,142

(22) Filed: Nov. 4, 2009

(65) Prior Publication Data
US 2011/0020204 A1 Jan. 27, 2011

Related U.S. Application Data (60) Provisional application No. 61/111,960, filed on Nov. 6, 2008.

(51) Int. Cl.
B01J 29/70 (2006.01)
B01J 37/30 (2006.01)
B01D 53/94 (2006.01)
B01J 37/02 (2006.01)
B01J 29/76 (2006.01)
B01J 37/00 (2006.01)

(52) U.S. Cl.
CPC ...... B01J 29/7015 (2013.01); B01D 53/9418 (2013.01); B01J 29/763 (2013.01); B01J 37/0246 (2013.01); B01J 37/30 (2013.01); B01D 53/9477 (2013.01); B01D 2251/2062 (2013.01); B01D 2255/50 (2013.01); B01D 2258/012 (2013.01); B01D 2258/014 (2013.01); B01J 37/0036 (2013.01); Y02T 10/24 (2013.01)

(58) Field of Classification Search
None
See application file for complete search history.

(56) References Cited

U.S. PATENT DOCUMENTS

| 3,402,996 | A | * | 9/1968 | Maher | B01J 20/186 |
|---|---|---|---|---|---|
| | | | | | 502/79 |
| 3,945,943 | A | * | 3/1976 | Ward | B01J 20/18 |
| | | | | | 502/64 |
| 4,046,888 | A | * | 9/1977 | Maeshima | B01D 53/8628 |
| | | | | | 423/239.1 |
| 4,220,632 | A | | 9/1980 | Pence et al. | |
| 4,297,328 | A | | 10/1981 | Ritcher et al. | |
| 4,440,871 | A | | 4/1984 | Lok et al. | |
| 4,503,023 | A | | 3/1985 | Breck et al. | |
| 4,544,538 | A | | 10/1985 | Zones | |
| 4,567,029 | A | | 1/1986 | Wilson et al. | |
| 4,735,930 | A | | 4/1988 | Gerdes et al. | |
| 4,753,927 | A | | 4/1988 | Gerdes et al. | |
| 4,861,743 | A | | 8/1989 | Flank et al. | |
| 4,867,954 | A | | 9/1989 | Staniulis et al. | |
| 4,874,590 | A | | 10/1989 | Staniulis et al. | |
| 4,961,917 | A | | 10/1990 | Byrne | |
| 5,011,667 | A | * | 4/1991 | Kuznicki et al. | 423/716 |
| 5,024,981 | A | | 6/1991 | Speronello et al. | |
| 5,041,270 | A | | 8/1991 | Fujitani et al. | |
| 5,096,684 | A | | 3/1992 | Guth et al. | |
| 5,233,117 | A | | 8/1993 | Barger | |
| 5,313,792 | A | | 5/1994 | Katoh et al. | |
| 5,417,949 | A | | 5/1995 | McWilliams et al. | |
| 5,477,014 | A | | 12/1995 | Dunne et al. | |
| 5,516,497 | A | | 5/1996 | Speronello et al. | |
| 5,589,147 | A | * | 12/1996 | Farnos | B01D 53/8621 |
| | | | | | 423/239.2 |
| 5,589,149 | A | | 12/1996 | Garland et al. | |
| 5,733,837 | A | | 3/1998 | Nakatsuji et al. | |
| 5,884,473 | A | | 3/1999 | Noda et al. | |
| 6,139,808 | A | | 10/2000 | Mizuno et al. | |
| 6,162,415 | A | | 12/2000 | Liu et al. | |
| 6,171,556 | B1 | | 1/2001 | Burk et al. | |
| 6,316,683 | B1 | | 11/2001 | Janssen et al. | |
| 6,319,487 | B1 | | 11/2001 | Liu et al. | |
| 6,350,298 | B1 | | 2/2002 | Su et al. | |
| 6,376,562 | B1 | | 4/2002 | Ihm et al. | |
| 6,395,674 | B1 | | 5/2002 | Fung et al. | |
| 6,416,732 | B1 | * | 7/2002 | Curran et al. | 423/700 |
| 6,503,863 | B2 | | 1/2003 | Fung et al. | |
| 6,569,394 | B2 | | 5/2003 | Fischer et al. | |
| 6,576,203 | B2 | | 6/2003 | Abe et al. | |
| 6,606,856 | B1 | | 8/2003 | Brown et al. | |

(Continued)

FOREIGN PATENT DOCUMENTS

CN 1590295 3/2005
CN 101166574 4/2008

(Continued)

OTHER PUBLICATIONS

Long, R. Q, et al. "Selective Catalytic Oxidation of Ammonia to Nitrogen over Fe exchanged Zeolites". Journal of Catalysis 201, 145-152 (2001).*
"Application of Isotopically Labelled IR Probe Molecules for Characterization of Porous Materials" K.I. Hadjiivanov, Ordered Porous Solids, pp. 263-268, 2009.*
Non-Final Office Action, dated Feb. 26, 2010 in U.S. Appl. No. 12/480,360, 19 pgs.
Ashtekar, Sunil et al., "Small-Pore Molecular Sieves SAPO-34 and SAPO-44 with Chabazite Structure: A Study of Silicon Incorporation", *J. Phys. Chem.* 1994, 98, (1994), 4878-4883.
Prakash, A M., et al., "Synthesis of SAPO-34: High Silicon Incorporation in the Presence of Morpholine as Template", *J. Chem. Soc. Faraday Trans.* 1994, 90(15), (1994),,2291-2296.

(Continued)

*Primary Examiner* — Sheng H Davis
(74) *Attorney, Agent, or Firm* — Womble Bond Dickinson (US) LLP (57) ABSTRACT

Disclosed are zeolite catalysts having the CHA crystal structure with a low silica to alumina ratio, as well as articles and systems incorporating the catalysts and methods for their preparation and use. The catalysts can be used to reduce NOx from exhaust gas streams, particularly those emanating from gasoline or diesel engines.

22 Claims, 5 Drawing Sheets

(56) References Cited

U.S. PATENT DOCUMENTS

| | | | |
|---|---|---|---|
| 6,685,905 B2 | 2/2004 | Mertens et al. | |
| 6,696,032 B2 | 2/2004 | Mertens et al. | |
| 6,709,644 B2 | 2/2004 | Zones et al. | |
| 6,826,906 B2 | 12/2004 | Kakwani et al. | |
| 6,974,889 B1 | 12/2005 | Verduijn et al. | |
| 7,014,827 B2 | 3/2006 | Mertens et al. | |
| 7,049,261 B2 | 5/2006 | Nam et al. | |
| 7,094,389 B2 | 8/2006 | Cao et al. | |
| 7,182,927 B2* | 2/2007 | Tran et al. | 423/237 |
| 7,229,597 B2 | 6/2007 | Patchett et al. | |
| 7,264,789 B1* | 9/2007 | Van Den Berge et al. | 423/716 |
| 7,481,938 B2 | 1/2009 | Brandts et al. | |
| 7,601,662 B2 | 10/2009 | Bull et al. | |
| 7,998,423 B2 | 8/2011 | Boorse et al. | |
| 8,293,198 B2 | 10/2012 | Buetel et al. | |
| 8,293,199 B2 | 10/2012 | Buetel et al. | |
| 8,404,203 B2 | 3/2013 | Bull et al. | |
| 2001/0038812 A1 | 11/2001 | Yavuz et al. | |
| 2001/0043896 A1 | 11/2001 | Domesle et al. | |
| 2002/0016252 A1 | 2/2002 | Takahashi et al. | |
| 2002/0084223 A1* | 7/2002 | Feimer et al. | 210/660 |
| 2003/0069449 A1 | 4/2003 | Zones et al. | |
| 2004/0082466 A1* | 4/2004 | Cao et al. | 502/214 |
| 2004/0098973 A1 | 5/2004 | Tennison et al. | |
| 2004/0166035 A1 | 8/2004 | Noda et al. | |
| 2004/0171476 A1 | 9/2004 | Nam et al. | |
| 2004/0209760 A1 | 10/2004 | Yoshikawa | |
| 2005/0031514 A1 | 2/2005 | Patchett et al. | |
| 2005/0096214 A1 | 5/2005 | Janssen et al. | |
| 2006/0039843 A1 | 2/2006 | Patchett et al. | |
| 2006/0115403 A1 | 6/2006 | Yuen | |
| 2006/0228283 A1* | 10/2006 | Malyala et al. | 423/239.1 |
| 2007/0000243 A1 | 1/2007 | Liu et al. | |
| 2007/0043249 A1 | 2/2007 | Cao et al. | |
| 2007/0081934 A1* | 4/2007 | Hubig | B01D 53/9481 423/239.1 |
| 2007/0149385 A1 | 6/2007 | Liu et al. | |
| 2007/0286798 A1 | 12/2007 | Cao et al. | |
| 2008/0044334 A1* | 2/2008 | Pieterse et al. | 423/239.2 |
| 2008/0202107 A1* | 8/2008 | Boorse et al. | 60/301 |
| 2008/0241060 A1 | 10/2008 | Li et al. | |
| 2008/0317999 A1 | 12/2008 | Patchett et al. | |
| 2009/0031710 A1* | 2/2009 | Wei | B01D 53/9495 60/287 |
| 2009/0048095 A1* | 2/2009 | Li et al. | 502/74 |
| 2009/0057199 A1 | 3/2009 | Ziebarth et al. | |
| 2009/0060809 A1 | 3/2009 | Shioya et al. | |
| 2010/0092362 A1* | 4/2010 | Li et al. | 423/239.2 |
| 2010/0209327 A1* | 8/2010 | Soeger et al. | 423/239.2 |
| 2010/0290963 A1 | 11/2010 | Andersen et al. | |

FOREIGN PATENT DOCUMENTS

| | | | |
|---|---|---|---|
| DE | 394541 A1 | | 6/1990 |
| DE | 3941541 | | 6/1990 |
| DE | 10059520 | | 5/2001 |
| EP | 0391351 | * | 3/1990 |
| EP | 0396085 | | 11/1990 |
| EP | 0396085 A2 | | 11/1990 |
| EP | 0624393 A1 | | 11/1994 |
| EP | 0773057 A1 | | 5/1997 |
| EP | 0950800 A2 | | 10/1999 |
| EP | 1837489 A1 | | 9/2007 |
| EP | 2517777 | * | 4/2008 |
| JP | 60-125250 | | 7/1985 |
| JP | 5-147470 A | | 6/1993 |
| JP | 6-48725 | | 2/1994 |
| JP | 05-057194 | | 9/1994 |
| JP | H07-155614 | | 6/1995 |
| JP | 07-232035 | | 9/1995 |
| JP | 09-038499 A | | 2/1997 |
| JP | 11-179158 | | 7/1999 |
| JP | 2000-054828 | | 2/2000 |
| JP | 2002-155729 | | 5/2002 |
| JP | 2003-290629 | | 10/2003 |
| JP | 2004-189534 A | | 7/2004 |
| JP | 2005-514319 | | 5/2005 |
| JP | 2006-89300 | | 4/2006 |
| JP | 2010-522688 | | 7/2010 |
| WO | WO-99/56859 | | 11/1999 |
| WO | WO 03/020641 A1 | | 3/2003 |
| WO | WO-03/035549 A1 | | 5/2003 |
| WO | WO-03/059849 | | 7/2003 |
| WO | WO-2007/004774 A1 | | 1/2007 |
| WO | WO-2007/005308 A2 | | 1/2007 |
| WO | WO-2008/019585 A1 | | 2/2008 |
| WO | 20080106518 A2 | | 9/2008 |
| WO | 20080106519 A1 | | 9/2008 |
| WO | WO-2008/118434 | | 10/2008 |
| WO | WO-2008/118434 A1 | | 10/2008 |
| WO | WO-2008/132452 A2 | | 11/2008 |

OTHER PUBLICATIONS

Palella, B I., et al., "On the hydrothermal stability of CuAPSO-34 microporous catalysts for N2O decomposition: a comparison with CuZSM-5", *Journal of Catalysis* 217 (2003), (2003), 100-106.

Ishihara, Tatsumi et al., "Copper Ion Exchanged Silicoaluminophosphate (SAPO) as a Thermostable Catalyst for Selective Reduction of NOx with Hydrocarbons", *Studies in Surface Science and Catalysis*, vol. 84 (1994), (1994), 1493-1500.

Ishihara, Tatsumi et al., "Selective Reduction of Nitrogen Monoxide with Propene over Cu-Silico-aluminophosphate (SAPO) under Oxidizing Atmosphere", *The Chemical Society of Japan* (1992), (1992),,2119-2122.

Ishihara, Tatsumi et al., "Copper Ion-Exchanged SAPO-34 as a Thermostable Catalyst for Selective Reduction of NO with C3H6", *Journal of Catalysis* 169 (1997), (1997), 93-102.

Ishihara, Tatsumi et al., "Thermostable Molecular Sieves, Silicoaluminophosphate (SAPO)-34, for the Removal of NOx with C3H6 in the Coexistence of O2, H2O, and SO2", *Ind. Eng. Chem. Res.* 1997, 36, (1997), 17-22.

Rebrov, E. V., et al., "Development of the Kinetic Model of Platinum Catalyzed Ammonia Oxidation in a Microreactor", *Chemical Engineering Journal* 90, (2002), 61-76.

Baerlocher, CH. et al., "Atlas of Zeolite Framework Types", *Elsevier—Fifth Revised Edition*, (2001), 5 pages.

Medros, F. G., et al., "Dual-Catalyst System to Broaden the Window of Operability in the Reduction of NOx with Ammonia", *Ind. Eng. Chem. Res.* 28, (1989), 1171-1177.

Akolekar, Deepak B., et al., "FTIR Investigations of the Absorption and Disproportionation of NO on Cu-Exchanged Silicoaluminophosphate of Type 34", *J. Chem. Soc. , Faraday Trans.*, 94(1), (1998), 155-160.

Torre-Abreu, C. et al., "Selective Catalytic Reduction of NO on Copper-Exchanged Zeolites: The Role of the Structure of the Zeolite in the Nature of Copper-Active Sites", *Catalysis Today* 54, (1999), 407-418.

PCT International Search Report for PCT/US2008/055148, 7 pgs.

PCT Written Opinion for PCT/US2008/055148, 6 pgs.

Prakash, A. M., et al., "Synthesis of SAPO-34: High Silicon Incorporation in the Presence of Morpholine as Template", *J. Chem. Soc. Faraday Trans.* 90(15), (1994), 2291-2296.

Uzunova, Ellie L., et al., "Adsorption of NO on Cu-SAPO-34 and Co-SAPO-34; A Periodic DFT Study", *J. Phys. Chem C* 2008, (2008), 2632-2639.

Ishihara, Tatsumi et al., "Thermostable Molecular Sieves, Silicoaluminophosphate (SAPO)-34, for the Removal of NOx with C3H6 in the Coexistence of O2, H2O, and SO2", *Ind. Enq. Chem. Res.*, 36, (1997), 17-22.

Palella, B. I., et al., "On the hydrothermal stability of CuAPSO-34 microporous catalysts for N2O decomposition: a comparison with CuZSM-5", *Journal of Catalysts* 217—Academic Press, (2003), 100-106.

Frache, A. et al., "Synthesis, Spectroscopic and Catalytic Properties of Cobalt and Copper Ions in Aluminophosphates with Chabasite-Like Structure, Studies of the NO Reactivity", *Studies in Surface Science and Catalysis* 140, (2001), 269-277.

(56) References Cited

OTHER PUBLICATIONS

Frache, A. et al., "Catalytic DeNOx activity of cobalt and copper ions in microporous MeALPO-34 and MeAPSO-34", *Catalysis Today* 75, (2002), 359-365.
Treacy, M.M. J., et al., "Proceedings of the 12th International Zeolite Conference", *Materials Research Society Conference Proceedings IV*, (Jul. 5-10, 1998), 6 pgs.
Akolekar, Deepak B., et al., "FTIR investigations of the adsorption and disproportionation of NO on Cu-exchanged silicoaluminophosphate of type 34", *J. Chem. Soc., Faraday Trans.*, 94(1), (1998), 155-160.
Barger, Paul T., et al., "Hydrothermal Stability of SAPO-34 in the Methanol-to-Olefins Process", *Tha Arabian Journal for Science and Engineering*, vol. 21, No. 2, (Apr. 1996), 10 pgs.
Marchese, L. et al., "ALPO-34 and SAPO-34 synthesized by using morpholine as templating agent. FTIR and FT-Raman studies of the host-guest and guest-guest interactions within the zeolitic framework", *Microporous and Mesoporous Materials* 30, (1999), 145-153.
Ishihara, Tatsumi et al., "Copper Ion-Exchanged SAPO-34 as a Thermostable Catalyst for Selective Reduction of NO with C3H6", *Journal of Catalysis* 169, Article No. CA971681, (1997), 93-102.
"Fourth International Congress on Catalysis and Automotive Pollution Control", (Apr. 1997), 7 pgs.
Palella, B. I., et al., "On the hydrothermal stability of CuAPSO-34 mircoporous catalysts for N2O decomposition: a comparison with CuZSM-5", *Journal of Catalysis* 217, (2003), 100-106.
Chen, Jiesheng et al., "Silicoaluminophosphate NO eighteen (SAPO-18): a new mircoporous solid acid catalyst", *Catalysis Letters* 28, (1994), 241-248.
Ishihara, Tatsumi et al., "Copper Ion Exchanged Silicoaluminophosphate (SAPO) as a Thermostable Catalyst for Selective Reduction of NOx with Hydrocarbons", *Studies in Surface Science and Datalysis*, vol. 84, (1994), 1493-1500.
Frache, A. et al., "CuAPSO-34 catalysts for N2O decomposition in the presence of H2O. A study of zeolite structure stability in comparison to Cu-SAPO-34 and Cu-ZSM-5", *Topics in Catalysis* vol. 22, Nos. 1/2, (2003), 5 pgs.
Zelenka, P. et al., "Exhaust gas aftetreatment systems for diesel engines with respect to future emission legislation", *Diesel Engine Technology* 96, (May 1993), 13 pgs.
Zelenka, P. et al., "Exhaust gas aftetreatment systems for diesel engines with respect to future emission legislation", 13 pgs.
"USPTO Non-Final Office Action dated Jan. 13, 2009 for U.S. Appl. No. 12/038,423, filed Feb. 27, 2008", 1-9.
Hartmann, Martin et al., "Transition-Metal Ions in Aluminophosphate and Silicoaluminophosphate Molecular Sieves: Location, Interaction with Adsorbates and Catalytic Properties", *Chem. Rev.* 99 (3), (1999), 635-663.
Barthomeuf, Denise "Journal: NATO ASI Series, Series C: Mathematical and Physical Sciences Issue 444", *Generation of acidity (amount and strength) in siliconaluminophosphates (SAPO zeolites)*, Examples of SAPO-5; 375-390, (1994), 17 pgs.
"Chinese Journal of Catalysis", *Thermal and Hydrothermal Stability of SAPO-34 Molecular Sieve*, vol. 17, No. 6, (Nov. 1996), 9 pgs.
"PCT International Search Report and Written Opinion in PCT/US2009/032610", (dated Jul. 16, 2009), 20 pgs.
Machine Translation from EPO of DE 394541 A1, 8 pgs.
Machine Translation of DE 3941541 A1, (Jun. 28, 1990), 8 pgs.
U.S. Appl. No. 10/634,659, filed Aug. 5, 2003.
Gabriele Centi Declaration, Sep. 22, 2010, 11 pgs.
Reexam Request in U.S. Pat. No. 7,601,662, 77 pgs.
Reexam Order in U.S. Pat. No. 7,601,662, 18 pgs.
Response to Reexamination Request in U.S. Pat. No. 7,601,662, 35 pgs.
Dedecek, J. et al., "Siting of the Cu+ ions in dehydrated ion exchanged synthetic and natural chabasites: a Cu+ photoluminescence study", *Microporous and Mesoporous Materials* 32 1999, 13 pgs.
Ishihara, Tatsumi et al., "Copper Ion-Exchanged SAPO-34 as a Thermostable Catalyst for Selective Reduction of NO with $C_3H_6$", *Journal of Catalysis*, vol. 169 1997, 10 pgs.

Lok, B. M. et al., "Silicoaluminophosphate Molecular Sieves: Another New Class of Microporous Crystalline Inorganic Solids", *Journal of the American Chemical Society*, vol. 106 1984, 6092-6093.
PCT International Search Report and Written Opinion for PCT/US2008/055140, 11.
Non-Final Office Action dated Jan. 13, 2009 for U.S. Appl. No. 12/038,423, filed Jan. 13, 2009, 16 pgs.
Amiridis, Michael D. et al., "Selective catalytic reduction of nitric oxide by hydrocarbons", *Applied Catalysis* 1996, 203-227 pgs.
Barger, Paul T. et al., "Hydrothermal Stability of SAPO-34 in the Methanol-to-Olefins Process", *Tha Arabian Journal for Science and Engineering*, vol. 21, No. 2 Apr. 1996, 10.
Breck, Donald W., "Zeolite Molecular Sieves", *John Wiley & Sons, A Wiley-Interscience Publication* 1974, 6 pgs.
Centi, G. et al., "Role of the Nature of Copper Sites in the Activity of Copper-Based Catalysts for NO Conversion", *Research on Chemical Intermediates*, 17 1992, 125-135 pgs.
Dedecek, Jiri et al., "Effect of Framework Charge Density on Catalytic Activity of Copper Loaded Molecular Sieves of Chabazite Structure in Nitrogen (II) Oxide Decomposition", *Collect. Czech. Chem. Commun.* (vol. 65) 2000, 343-351 pgs.
Frache, A. et al., "Spectroscopic characterisation of microporous aluminophosphate materials with potential application in environmental catalysis", *Catalysis Today* 77 2003, 371-384.
Heck, Ronald M. et al., "Catalytic Air Pollution Control", *A John Wiley & Sons, Inc., Publication—Wiley-Interscience* 2002, 3 pgs.
Kim, Moon Hyeon, et al., "Water Tolerance of $DeNO_x$ SCR Catalysts Using Hydrocarbons: Findings, Improvements and Challenges", *Korean J. Chem. Eng.*, 18(5) 2001, 16 pgs.
Kwak, Ja H. et al., "Excellent activity and selectivity of Cu-SSZ-13 in the selective catalytic reduction of NOx with NH3", *Journal of Catalysis* 2010, 4 pgs.
Miller, William R. et al., "Urea selective catalytic reduction", *2010 Factiva, Inc.* 2000, 9 pgs.
Misono, Makoto, "Catalytic reduction of nitrogen oxides by bifunctional catalysts", *Baltzer Science Publishers* vol. 2, No. 2 Dec. 1998, 24 pgs.
Watanabe, Yoshihide et al., "Multinuclear NMR Studies on the Thermal Stability of SAPO-34", *Journal of Catalysis* 1993, 430-436 pgs.
Final Office Action in U.S. Appl. No. 12/480,360, dated Jul. 26, 2010, 11 pgs.
Non-Final Office Action in U.S. Appl. No. 12/361,980, dated Sep. 22, 2010, 26 pgs.
Brandenberger, Sandro et al., "The State of the Art in Selective Catalytic Reduction of NOx by Ammonia Using Metal-Exchanged Zeolite Catalysts", *Catalysis Reviews* 50:4 2008, 41 pgs.
Cavataio, Giovanni et al., "Cu/Zeolite SCR on High Porosity Filters: Laboratory and Engine Performance Evaluations", *SAE International, Ford Motor Company* 2009, 10 pgs.
Cavataio, Giovanni et al., "Development of Emission Transfer Functions for Predicting the Deterioration of a Cu-Zeolite SCR Catalyst", *SAE International, Ford Motor Company* 2009, 1-17.
Cavataio, Giovanni et al., "Enhanced Durability of a Cu/Zeolite Based SCR Catalyst", *SAE Int. J. Fuels Lubr.*, vol. 1, Issue 1 2008, 477-487.
Cavataio, Giovanni et al., "Laboratory Testing of Urea-SCR Formulations to Meet Tier 2 Bin 5 Emissions", *SAE International, 2007 World Congress* 2007, 16 pgs.
Centi, Gabriele et al., "Nature of active species in copper-based catalysts and their chemistry of transformation of nitrogen oxides", *Applied Catalysts A: General* 132 1995, 179-259.
Centi, G., "Review Paper on Zeolites in Corma Treatise", *Zeolites and Catalysts*, vol. 1, 51 pgs.
Chang, Russell et al., "Thermal durabiluty and deactivation of Cuzeolite SCR catalysts", *Johnson Matthey Inc.*, 1 pgs.
Cheng, Yisun et al., "Sulfur Tolerance and DeSOx Studies on Diesel SCR Catalysts", *SAE Int. J. Fuels Lubr.*, vol. 1, Issue 1 2008, 471-476.
Cheng, Yisun et al., "The Effects of SO2 and SO3 Poisoning on Cu/Zeolite SCR Catalysts", *SAE International* 2009, 7 pgs.

(56) References Cited

OTHER PUBLICATIONS

Chung, Sung Y. et al., "Effect of Si/Al ratio of Mordenite and ZSM-5 type Zeolite Catalysts on Hydrothermal Stability for NO Reduction by Hydrocarbons", *Studies in Surface Science Catalysis*, vol. 130 2000, 1511-1516.
Fickel, Dustin W. et al., "Copper Coordination in Cu-SSZ-13 and Cu-SSZ-16 Investigated by Variable-Temperature XRD", *J. Phys. Chem C*, 114 2010, 1633-1640.
Fickel, Dustin W., "Investigating the High-Temperature Chemistry of Zeolites: Dehydrogenation of Zeolites and NH3-SCR of Copper Exchanged Small-Pore Zeolites", *Dissertation* 2010, 1-199.
Girard, James et al., "Influence of Hydrocarbon Storage on the Durabiluty of SCR Catalysts", *SAE International, 2008 World Congress* 2008, 10 pgs.
Li, Yuejin et al., "Selective NH3 Oxidation to N2 in a Wet Stream", *Applied Catalysis B: Environmental* 13 1997, 131-139.
Long, R. Q. et al., "Selective Catalytic Oxidation (SCO) of Ammonia to Nitrogen over Fe-Exchanged Zeolites", *Journal of Catalysis* 201 2001, 145-152.
Pelella, B. I. et al., "Enhancement of Hydrothermal Stability of Cu-ZSM5 Catalyst for NO Decomposition", *Kinetics and Catalysis*, vol. 47, No. 5 2006, 728-736.
Pluth, J. J. et al., "Positions of Cations and Molecules in Zeolites with the Chabazite Framework. IV Hydrated and Dehydrated Cu2+-Exchanged Chabazite", *Mat. Res. Bull*,, vol. 12 1977, 1001-1007.
Qi, Gongshin et al., "Selective Catalytic Reduction of Nitric Oxide with Ammonia over ZSM-5 Based Catalysts for Diesel Engine Applications", *Catal Lett* 121 2008, 111-117.
Rahkamaa-Tolonen, Katariina et al., "The effect of NO2 on the activity of fresh and aged zeolite catalysts in the NH3-SCR reaction", *Catalysts Today*, 100 2005, 217-222.
Xu, Lifeng et al., "Impact of a Cu-zeolite SCR Catalyst on the Performance of a Diesel LNT+SCR System", *SAE International* 2009, 12 pgs.
Non-Final Office Action in U.S. Appl. No. 12/361,980, dated Mar. 23, 2011, 24 pgs.
Final Office Action in U.S. Appl. No. 12/970,582, dated Mar. 26, 2012, 13 pgs.
Non-Final Office Action in U.S. Appl. No. 12/480,360, dated Feb. 1, 2012, 20 pgs.
Non-Final Office Action in U.S. Appl. No. 12/970,545, dated Mar. 20, 3012, 14 pgs.
Action Closing Prosecution in U.S. Appl. No. 95/001,453, dated May 11, 2012, 69 pgs.
"Final Office Action in U.S. Appl. No. 12/480,360, dated Jul. 18, 2012", 10 pgs.
Final Office Action in U.S. Appl. No. 13/214,391, dated May 2, 2013, 15 pgs.
"Brief on Appeal-Requester", Control No. 95/001,453 Jun. 14, 2012 , 48 pgs.
"Declaration (G) by Alexander Green, Ph.D., Under 37 C.F.R. § 1.132", Control No. 95/001,453 Sep. 12, 2012 , 8 pgs.
"Non-Final Office Action in U.S. Appl. No. 13/214,445", dated Mar. 5, 2013, 28 pages.
Amendment/Response Under 37 CFR 1.114 in U.S. Appl. No. 13/214,391, filed Nov. 1, 2013, 10 pages.
Final Office Action in U.S. Appl. No. 13/214,391, dated Jan. 14, 2014, 11 pages.
Declaration Under 37 CFR 1.131 of Ahmad Moini in U.S. Appl. No. 13/214,391, dated Nov. 1, 2013, 3 pages.
Exhibit A filed with the 1.131 Declaration of Ahmad Moini, 8 pages.
Machine Translation of JP 2006-089300, 19 pages.
Machine Translation of JP A-H07-155614, 8 pages.
Non-Final Office Action in U.S. Appl. No. 13/214,391, dated Oct. 26, 2012, 37 pgs.
Action Closing Prosecution in U.S. Appl. No. 95/001,453, dated Nov. 18, 2011, 102 pgs.
Declaration by Gabriele Centi, Ph.D, 48 pgs.
Declaration by Johannes A. Lercher, PH.D., 13 pgs.
Declaration by Wolfgang Strehlau, PH.D., 18 pgs.
Non-Final Office Action in U.S. Appl. No. 12/970,545, dated Dec. 5, 2011, 21 pgs.
Non-Final Office Action in U.S. Appl. No. 12/970,582, dated Dec. 7, 2011, 25 pgs.
Third Party Comments After Patent Owner's Response After ACP Under 37 CFR 1.951, dated Jan. 18, 2012, 40 pgs.
Japanese Information Offer Form 1 in JP Patent Appln. No. 2009-551821, filed Jun. 26, 2014, 10 pages.
Japanese Information Offer Form 2 in JP Patent Appln. No. 2009-551821, filed Jul. 18, 2014, 13 pages.
Non-Final Office Action in U.S. Appl. No. 13/214,391, dated Jul. 3, 2014, 10 pages.
Sjovall, Hanna, et al., Selective catalytic reduction of NOx with NH3 over Cu-ZSM-5—The effect of changing the gas composition, *Applied Catalysis B: Environmental* vol. 64 2006, 180-188.
Stevenson, Scott, A., et al., Kinetics of the Selective Catalytic Reduction of NO over HZSM-5, *Journal of Catalysis*, vol. 190 2000, 228-239.
Final Office Action in U.S. Appl. No. 13/214,391, dated Feb. 25, 2015, 11 pages.
Non-Final Office Action in U.S. Appl. No. 14/598,854, dated Mar. 24, 2015, 10 pages.
Non-Final Office Action in U.S. Appl. No. 14/598,809, dated Mar. 18, 2015, 8 pages.
Non-Final Office Action in U.S. Appl. No. 13/214,391, dated May 13, 2015, 15 pages.
Ono, et. A. "Science and Engineering of Zeolite", 2000, pp. 1, 248 and 249, published from Kodansha.
Ozaki, Atsumu,"Catalyst Preparation Chemistry", 1980, pp. 66 to 69, published from Kodansha.
Reasons for Revocation—Opposition No. 2019-700259—Japanese Patent 6403658, dated Aug. 8, 2019.

* cited by examiner

CHABAZITE ZEOLITE CATALYSTS HAVING LOW SILICA TO ALUMINA RATIOS

CROSS REFERENCE TO RELATED APPLICATIONS

This application claims the benefit of U.S. Provisional Application No. 61/111,960, filed on Nov. 6, 2008, the entire content of which is hereby incorporated by reference in its entirety.

TECHNICAL FIELD

Embodiments of the invention relate to zeolites that have the CHA crystal structure, methods for their preparation, and catalytic articles and systems comprising such zeolites. More particularly, embodiments of the invention pertain to CHA zeolite catalysts, methods for their preparation, and their use in exhaust gas treatment systems.

BACKGROUND

Zeolites are aluminosilicate crystalline materials having rather uniform pore sizes which, depending upon the type of zeolite and the type and amount of cations included in the zeolite lattice, typically range from about 3 to 10 Angstroms in diameter. Both synthetic and natural zeolites and their use in promoting certain reactions, including the selective reduction of nitrogen oxides with ammonia in the presence of oxygen, are well known in the art.

One particular zeolite that has found use as a catalyst is chabazite (CHA). Methods for its preparation are known in the art. For example, U.S. Pat. No. 4,544,538 to Zones discloses the synthetic preparation of high silica form (Si/Al ratio of ~15-30) of chabazite known as SSZ-13. It is prepared using an organically templated (N,N,N-trimethyl-1-adamantammonium) hydrothermal synthesis at high temperature (~150° C.) and autogenous pressure.

There is a desire to obtain and/or prepare CHA catalysts via processes other than the organically templated hydrothermal synthesis process used to prepare the high silica SSZ-13 CHA. In this way, it is possible that CHA catalysts can be obtained and/or prepared in a more affordable and economical manner. In addition, CHA catalysts obtained from sources that do not utilize organically template hydrothermal synthesis.

SUMMARY

Aspects of the present invention are directed to zeolites that have the CHA crystal structure (as defined by the International Zeolite Association), processes for preparing such zeolites, catalytic articles comprising such zeolites, and exhaust gas treatment systems and methods incorporating such catalytic articles. The catalytic articles may be part of an exhaust gas treatment system used to treat exhaust gas streams, especially those emanating from gasoline or diesel engines.

Accordingly, one aspect of the present invention is directed to a catalytic article comprising a zeolite having the CHA crystal structure disposed on a substrate operative to reduce NOx, wherein the zeolite is a low silica chabazite and having a low alkali content. The zeolite has a low silica to alumina ratio, for example, below about 15, more specifically below about 10, even specifically below about 5. Any substrate can be used for disposition of the zeolite, including, for example, honeycomb substrates, foam substrates, and soot filters.

In some embodiments, the zeolite is a non-synthetic, naturally occurring chabazite, such as Bowie chabazite. In other embodiments, the zeolite is a synthetic chabazite. The zeolite may be modified with one or more metal cations. Suitable metals include any redox active metal, including, but not limited to, copper, iron, and cobalt. The zeolite can be modified by any method known in the art, such as ion exchange.

Another aspect of the present invention is directed to an exhaust gas treatment system comprising a catalytic article comprising a zeolite having the CHA crystal structure disposed on a substrate operative to reduce NOx, wherein the zeolite is a low silica chabazite. In various embodiments, the catalytic article is in fluid communication with other gas treatment components, such as an oxidation catalyst, a SCR catalyst, an AMOX catalyst, a soot filter, etc.

Another aspect of the present invention is directed to process for reducing NOx in a gas stream comprising contacting the gas stream with a catalytic article of claim 1 article comprising a zeolite having the CHA crystal structure disposed on a substrate operative to reduce NOx, wherein the zeolite is a low silica chabazite. In some embodiments, the gas stream is contacted with the exhaust article in the presence of $NH_3$, thereby providing a selective catalytic reduction (SCR) system.

Another aspect of the present invention is directed to a process for preparing a catalytic article comprising applying a zeolite having the CHA crystal structure as a washcoat to a substrate, wherein the zeolite is a low silica chabazite and has a low alkali content as described herein. In some embodiments, the washcoat further comprises a binder. In still other embodiments, the washcoat further comprises a refractory metal oxide support. A platinum group metal component may be disposed on the refractory metal oxide support for further catalytic function.

In some embodiments, the zeolite of the catalytic article is provided by a process comprising mixing an alumina source, a silica source, and sources of one or more of sodium, potassium and TMA to form an aqueous gel, and crystallizing the gel by heating to form the zeolite. In specific embodiments, the process is performed at a temperature below about 100° C. at atmospheric pressure. In other embodiments, the zeolite may be provided using an organically templated hydrothermal synthesis process in the presence of e.g., KOH, NaOH and tetramethylammonium hydroxide. In one or more embodiments, the zeolite of the catalytic article is mixed with a second zeolite such as zeolite having the CHA crystal structure and a having a silica to alumina mole ratio exceeding 15 as described further below.

Another aspect of the invention pertains to methods of making catalysts of type described above, comprising ion exchanging an alkali form of a zeolite having the CHA crystal structure containing an initial alkali content with a solution to reduce the alkali content; calcining the ion exchanged zeolite with the reduced alkali content to provide a calcined zeolite; and subsequently ion exchanging the calcined zeolite with a solution to further reduce the alkali content to provide the zeolite having a mole ratio of silica to alumina of less than about 15 and an alkali content of less than about 3 weight percent. In specific embodiments, the solution is an ammonium salt solution, and the calcining occurs at a temperature of at least about 350° C. for at least about one hour. In one or more embodiments, methods may further comprise conducting a metal ion exchange with an iron or copper solution to provide a metal promoted zeolite.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

Aspects of the present invention are directed to CHA zeolites and their use in catalytic articles, such as SCR catalysts. Such catalytic articles find particular utility in the treatment of exhaust gas streams, especially those emanating from gasoline or diesel engines. Applicants have found that catalytic articles made by the processes disclosed herein exhibit excellent hydrothermal stability and high catalytic activity over a wide temperature range. When compared with other zeolitic catalysts that find application in this field, such as Fe-Beta zeolites, CHA catalytic materials according to embodiments of the present invention offer improved low temperature activity and hydrothermal stability. In addition, the CHA catalytic materials disclosed herein can be prepared in a more affordable and economical manner than SSZ-13 CHA catalysts. Previously, it was believed that low Si/Al ratio CHA zeolites did not exhibit sufficient NOx conversion and/or hydrothermal stability to be used as NOx reduction catalysts. According to one or more embodiments of the invention, low Si/Al ratio CHA zeolites having low alkali content exhibit good hydrothermal stability and NOx conversion exceeding at least about 50%.

Zeolites

The zeolites used to prepare the catalytic materials disclosed herein have the CHA crystal structure. In specific embodiments, the Si/Al ratio of the CHA zeolite is low, more particularly lower than that for SSZ-13 CHA. The Si/Al ratio of the CHA zeolite is specifically less than about 15, more specifically less than about 10, even more specifically less than about 5. Applicants have found that such CHA zeolites can be quickly and economically obtained from natural sources or synthetically prepared using processes distinct from those used to prepare CHA zeolites with high Si/Al ratios, such as SSZ-13 CHA. In one or more embodiments, the CHA zeolite has a low Si/Al ratio and also has a low alkali content. As used herein, alkali content is expressed on a wt % basis in terms of the respective oxides for sodium, calcium and potassium present as cations in the zeolite. In one or more embodiments, such CHA zeolites exhibit good hydrothermal stability and NOx conversion for use as NOx reduction catalyst.

Accordingly, in some embodiments, the CHA zeolite is a non-synthetic, naturally occurring chabazite. Any natural chabazite can be used. One particularly useful form is Bowie chabazite. In some embodiments, the natural chabazite is purified prior to processing. In other embodiments, the natural chabazite is used unpurified, which may offer catalytic benefits as targets for HC or S poisoning, and therefore protect the catalytic articles from deactivation.

As an alternative to natural chabazite, the zeolite can be a synthetic CHA. In specific embodiments, the process used to prepare the synthetic CHA zeolite is a process that does not utilize organically templated hydrothermal synthesis used to prepare high silica CHA zeolites, such as SSZ-13 CHA. The synthetic form of chabazite can be prepared by a process comprising mixing an alumina source, a silica source, and sources of one or more of sodium, potassium and trimethylammonium ion (TMA) to form an aqueous gel, and crystallizing the gel by heating to form the zeolite. Typical silica sources include various types of fumed silica, precipitated silica, and colloidal silica, as well as silicon alkoxides. Typical alumina sources include boehmites, pseudo-boehmites, aluminum hydroxides, aluminum salts such as aluminum sulfate, and aluminum alkoxides. Sodium hydroxide and/or potassium hydroxide may be added to the reaction mixture, but is not required. In specific embodiments, the process is performed at a temperature below about 100° C. at atmospheric pressure. However, it has been found that suitable synthetic CHA having the specific Si/Al ratio can be obtained using organically templated hydrothermal synthesis in the presence of e.g., KOH, NaOH and tetramethylammonium hydroxide.

At the conclusion of the synthesis reaction, the CHA product is generally filtered and washed with water. Alternatively, the product may be centrifuged. Organic additives may be used to help with the handling and isolation of the solid product. Spray-drying is an optional step in the processing of the product. The solid product is generally thermally treated in air or nitrogen. Alternatively, each gas treatment can be applied in various sequences, or mixtures of gases can be applied. The product may be calcined. Typical calcination temperatures are in the 400° C. to 700° C. range.

The natural or synthetic chabazite can be modified with one or more metal cations. Suitable metals include any redox active metal, including, but not limited to, copper, iron, and cobalt. One specific form of modified chabazite is Cu-CHA. Cu-modified natural CHA is herein termed "CuNatCHA," while Cu-modified synthetic CHA is herein termed "CuSynCHA." The zeolite can be metal modified by any method known in the art, such as ion exchange.

In one aspect of the invention, CuNatCHA and CuSynCHA having a low Si/Al ratio are provided that also have a relatively low alkali content. In one embodiment, the alkali content is present in amount less than about 6 weight percent, more specifically less than about 3 weight percent, less than about 2 weight percent, less than about 1 weight percent, less than about 0.5 weight percent, less than about 0.1 weight percent, or less than 0.05 weight percent. The alkali content can be reduced to the desired level by a variety of procedures. In an exemplary embodiment, an alkali form of the zeolite can be ion exchanged followed by calcination followed by a subsequent ion exchange. As used herein, "alkali form" of the zeolite refers to a zeolite containing an alkali metal content such as Na or K. In specific embodiments, multiple ion exchanges, for example, two, three, four or five exchanges, occur before calcination. In specific embodiments, ion exchange is performed using an ammonium salt such as ammonium nitrate, to provide an ammonium form of the zeolite. Other suitable salts include, but are not limited to ammonium acetate, carbonate, chloride, citrate, sulfate, and combinations of thereof. In specific embodiments, calcination is performed at a temperature of at least about 350° C., 400° C., at least about 450° C., at least about 500° C., or at about 540° C. for at least about 1, 2, 3, or 4 hours. Higher temperatures may be utilized for the calcinations after ammonium ion exchange, for example 600° C., 650° C., 700° C. and temperatures up to about 1000° C. In a specific embodiment, calcinations is performed after a single ion exchange with ammonium nitrate at 540° C. for at least two hours, and at least two subsequent ion exchanges are performed to provide a low alkali content zeolite. It has been found that a sequence of multiple ion exchanges, followed by calcinations, followed by at least one ion exchange after calcinations significantly reduces the alkali content of the zeolite. In specific embodiments, the alkali content is reduced to less than about 6, 5, 3, 1, 0.5, 0.1 or 0.01 weight percent. Reductions in the alkali oxide weight percent in the zeolite provide a CuNatCHA and CuSynCHA with a low Si/Al ratio and low alkali content that exhibit reduction in NOx in exhaust gas streams exceeding at least about 50%.

In one or more embodiments, the catalytic article comprises CuNatCHA or CuSynCHA having a low Si/Al ratio (e.g., less than 15 or less than 10) are provided that also have a relatively low alkali content (e.g., less than about 6 weight percent, 3 weight percent, 1 weight percent or 0.5 weight percent, mixed with a zeolite having the CHA crystal structure a silica to alumina ratio greater than 15, an example of which being SSZ-13. The mixture can contain any suitable amount of each zeolite to obtain the desired NOx reduction and hydrothermal stability. For example, the mixture can contain up to 10%, 20%, 30%, 40%, 50%, 60%, 70%, 80%, or 90% by weight of a zeolite having the CHA crystal structure a silica to alumina ratio greater than about 15. Desirably, the zeolite can be promoted with a metal such as iron or copper. The mixture of zeolites can be achieved by forming separate slurries of the two zeolite powders and mixing the slurries, or by forming a single slurry of the two powders. A particularly suitable zeolite having the CHA crystal structure has a mole ratio of silica to alumina greater than about 15 and an atomic ratio of copper to aluminum exceeding about 0.25. More particularly, the mole ratio of silica to alumina is from about 15 to about 256, for example 15 to 40 or about 30, and the atomic ratio of copper to aluminum is from about 0.25 to about 0.50, more particularly about 0.30 to about 0.50, for example 0.40. Examples of such zeolites are disclosed in U.S. Pat. No. 7,601,662, the entire content of which is incorporated herein by reference.

Experimentation has indicated that improved performance of catalytic articles in accordance with embodiments of the invention is associated with Cu loading. While Cu can be exchanged to increase the level of Cu associated with the exchange sites in the structure of the zeolite, it has been found that it is beneficial to leave non-exchanged Cu in salt form, for example, as $CuSO_4$ within the zeolite catalyst. Upon calcination, the copper salt decomposes to what is herein known as "free copper" or "soluble copper." According to one or more embodiments, this free copper is both active and selective, resulting in low $N_2O$ formation when used in the treatment of a gas stream containing NOx. Unexpectedly, this free copper has been found to impart greater stability in catalysts subjected to thermal aging at temperatures up to about 800° C.

Substrates

According to some embodiments of the present invention, the CHA zeolites can be in the form of self supporting catalytic particles. Specifically, however, the CHA zeolite catalysts are disposed on a substrate to provide a catalytic article. The substrate may be any of those materials typically used for preparing catalysts, and will usually comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is disposed as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 400 or more gas inlet openings (i.e., cells) per square inch of cross section.

The substrate can also be a wall-flow filter substrate, where the channels are alternately blocked, allowing a gaseous stream entering the channels from one direction (inlet direction), to flow through the channel walls and exit from the channels from the other direction (outlet direction). If a wall flow substrate is utilized, the resulting system will be able to remove particulate matter along with gaseous pollutants. The wall-flow filter substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alpha-alumina, an aluminosilicate and the like.

Substrates may also be metallic in nature and be composed of one or more metals or metal alloys. The metallic substrates may be employed in various shapes such as corrugated sheet or monolithic form. Suitable metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface or the metal substrates may be oxidized at high temperatures, e.g., 1000° C. and higher, to improve the resistance to corrosion of the alloys by forming an oxide layer on the surfaces the substrates. Such high temperature-induced oxidation may enhance the adherence of the refractory metal oxide support and catalytically promoting metal components to the substrate.

In alternative embodiments, the CHA zeolite catalysts may be deposited on an open cell foam substrate. Such substrates are well known in the art, and are typically formed of refractory ceramic or metallic materials. The catalysts may also be deposited on a soot filter to prepare a catalyzed soot filter (CSF).

Washcoat Preparation

The catalytic articles of embodiments of the present invention are generally prepared by applying the CHA zeolite as a washcoat to a substrate. Washcoats of the CHA zeolite can be prepared using a binder. According to one or more embodiments, a $ZrO_2$ binder derived from a suitable precursor, such as zirconyl acetate or any other suitable zirconium precursor, such as zirconyl nitrate, is used. In one embodiment, zirconyl acetate binder provides a catalytic coating that remains homogeneous and intact after thermal aging, for example, when the catalyst is exposed to high temperatures of at least about 600° C., for example, about 800° C. and higher, and high water vapor environments of about 10% or more. Keeping the washcoat intact is beneficial because loose or free coating could plug a downstream CSF causing the backpressure to increase.

In one or more embodiments of the present invention, the CHA zeolite catalyst comprises a precious metal component, i.e., a platinum group metal component. For example, as discussed below, ammonia oxidation (AMOX) catalysts typically include a platinum metal component. Suitable platinum metal components include platinum, palladium, rhodium and mixtures thereof. The several components (for example, the CHA zeolite and precious metal component) of the catalyst material may be applied to the refractory carrier member, i.e., the substrate, as a washcoat mixture of two or more components or as individual washcoat components in sequential steps in a manner which will be readily apparent to those skilled in the art of catalyst manufacture. This may be accomplished by impregnating a fine particulate refractory metal oxide support material, e.g., gamma alumina, with one or more catalytic metal components such as a precious metal, i.e., platinum group metal or other noble metals or base metals, drying and calcining the impregnated support particles, and forming an aqueous slurry of these particles. Particles of the CHA zeolite may be included in the slurry. Activated alumina may be thermally stabilized before the catalytic components are dispersed thereon, as is well known in the art, by impregnating it with, e.g., a solution of a soluble salt of barium, lanthanum, zirconium, rare earth metal or other suitable stabilizer precursor, and thereafter drying (e.g., at 110° C. for one hour) and calcining (e.g., at 550° C. for one hour) the impregnated activated alumina to form a stabilizing metal oxide dispersed onto the alumina. Base metal catalysts may optionally also be impregnated into the activated alumina, for example, by impregnating a solution of a base metal nitrate into the alumina particles and calcining to provide a base metal oxide dispersed in the alumina particles.

The substrate may then be immersed into the slurry of CHA zeolite, binder, and impregnated activated alumina or other support particle (or unsupported precious metal) and excess slurry removed to provide a thin coating of the slurry on the walls of the gas-flow passages of the substrate. Alternatively, the supported or unsupported precious metal and CHA zeolite are applied as separate slurries. When deposited on a honeycomb monolith substrate, the catalytic compositions are generally deposited at a concentration of at least about 0.5 g/in$^3$, for example, about 1.3 g/in$^3$ about 2.4 g/in$^3$ or higher, to ensure that the desired NOx reduction is achieved and to secure adequate durability of the catalytic article over extended use. The coated substrate is then dried and generally calcined to provide an adherent coating of the catalytic material, to the walls of the passages thereof. One or more additional layers of the slurry may be provided to the carrier. After each layer is applied, or after a number of desired layers are applied, the carrier is then dried and calcined to provide a finished catalytic article in accordance with embodiments of the present invention.

Catalytic Articles

The catalytic articles of the present invention find particular utility in the treatment of exhaust gas streams, especially those emanating from gasoline or diesel engines. In use, an exhaust gas stream is contacted with a catalytic article prepared in accordance with embodiments of the present invention. As discussed below, the catalytic articles have excellent NOx reduction activity over a wide range of operative temperatures. As such, the catalytic articles are useful as SCR catalysts. The term "SCR catalyst" is used herein in a broad sense to mean a selective catalytic reduction in which a catalyzed reaction of nitrogen oxides with a reductant occurs to reduce the nitrogen oxides. "Reductant" or "reducing agent" is also broadly used herein to mean any chemical or compound tending to reduce NOx at elevated temperature. In specific embodiments, the reducing agent is ammonia, specifically an ammonia precursor, i.e., urea, and the SCR is a nitrogen reductant SCR. However, in accordance with a broader scope of the invention, the reductant could include fuel, particularly diesel fuel and fractions thereof as well any hydrocarbon and oxygenated hydrocarbons collectively referred to as an HC reductant.

Theoretically, it would be desirable in the SCR process to provide the reductant (i.e., ammonia) in excess of the stoichiometric amount required to react completely with the NOx present, both to favor driving the reaction to completion and to help overcome inadequate mixing of the ammonia in the gaseous stream. However, in practice, significant excess ammonia over such stoichiometric amount is normally not provided because the discharge of unreacted ammonia from the catalyst to the atmosphere would itself engender an air pollution problem. Such discharge of unreacted ammonia can occur even in cases where ammonia is present only in a stoichiometric or sub-stoichiometric amount, as a result of incomplete reaction and/or poor mixing of the ammonia in the gaseous stream, resulting in the formation therein of channels of high ammonia concentration. Such channeling is of particular concern when utilizing catalysts comprising monolithic honeycomb-type substrates comprising refractory bodies having a plurality of fine, parallel gas flow paths extending therethrough because, unlike the case of beds of particulate catalyst, there is no opportunity for gas mixing between channels.

To address this concern, AMOX catalysts can be provided in the catalytic system to oxidize the unreacted ammonia. Applicants have found that a CuCHA washcoat containing a precious metal, for example, Pt, provides an AMOX catalyst. It is expected that not only is ammonia in gas flowing through the catalyst destroyed, but there is also continued removal of NOx by conversion to $N_2$.

According to methods known in the art, the CHA catalytic articles can be formulated to favor either the SCR process or the AMOX process by controlling the Cu content of the zeolite (when present). U.S. Pat. No. 5,516,497 teaches iron and copper loading levels on zeolites to obtain selectivity for either an SCR reaction or the oxidation of ammonia by oxygen at the expense of the SCR process, thereby improving ammonia removal. In accordance with embodiments of the invention, CuNatCHA or CuSynCHA copper loading can be tailored to obtain selectivity for SCR reactions and oxidation of ammonia by oxygen and to provide exhaust gas treatment systems utilizing both types of catalyst.

Further to this goal, a staged or two-zone catalytic article can be provided with a first catalytic zone comprising a CHA zeolite that promotes SCR followed by a second catalytic zone comprising a CuCHA zeolite that promotes oxidation of ammonia. The resultant catalytic article thus has a first (upstream) zone which favors the reduction of nitrogen oxides with ammonia, and a second (downstream) zone which favors the oxidation of ammonia. In this way, when ammonia is present in excess of the stoichiometric amount, whether throughout the flow cross section of the gaseous stream being treated or in localized channels of high ammonia concentration, the oxidation of residual ammonia by oxygen is favored by the downstream or second catalyst zone. The quantity of ammonia in the gaseous stream discharged from the catalyst is thereby reduced or eliminated. The first zone and the second zones can be provided on a single catalytic article or as separate catalytic articles.

Exhaust Gas Treatment Systems

The CHA zeolite catalytic articles of the present invention can be provided in an exhaust gas treatment system, such as the ones found in gasoline- and diesel-powered automobiles. In such exhaust gas treatment systems, the CHA zeolite catalytic articles generally provided in fluid communication with other gas treatment components, either upstream or downstream of the catalytic articles.

Figure 4A:
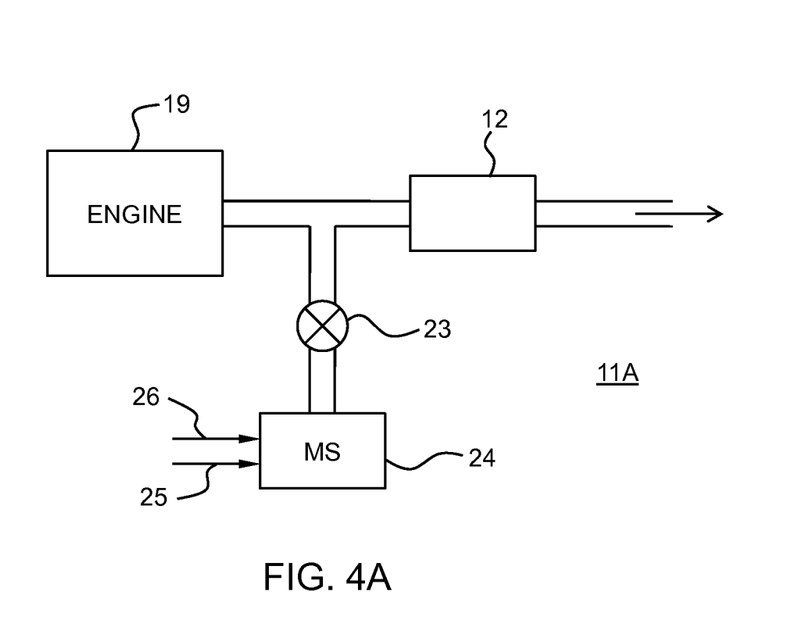
FIGS. 4A-C depict various exhaust gas treat systems comprising catalytic articles made in accordance with the present invention.

One embodiment of the inventive emissions treatment system denoted as 11A is schematically depicted in FIG. 4A. The exhaust, containing gaseous pollutants (including unburned hydrocarbons, carbon monoxide and NOx) and particulate matter, is conveyed from the engine 19 to a position downstream in the exhaust system where a reductant, i.e., ammonia or an ammonia-precursor, is added to the exhaust stream. The reductant is injected as a spray via a nozzle (not shown) into the exhaust stream. Aqueous urea shown on one line 25 can serve as the ammonia precursor which can be mixed with air on another line 26 in a mixing station 24. Valve 23 can be used to meter precise amounts of aqueous urea which are converted in the exhaust stream to ammonia.

The exhaust stream with the added ammonia is conveyed to the SCR catalyst substrate 12 (also referred to herein including the claims as "the first article" or "the first substrate") containing CuNatCHA or CuSynCHA in accordance with one or more embodiments. On passing through the first substrate 12, the NOx component of the exhaust stream is converted through the selective catalytic reduction of NOx with $NH_3$ to $N_2$ and $H_2O$. In addition, excess $NH_3$ that emerges from the inlet zone can be converted through oxidation by a downstream ammonia oxidation catalyst (not shown) also containing CuNatCHA or CuSynCHA to convert the ammonia to $N_2$ and $H_2O$. The first substrate is typically a flow through monolith substrate.

Figure 4B:
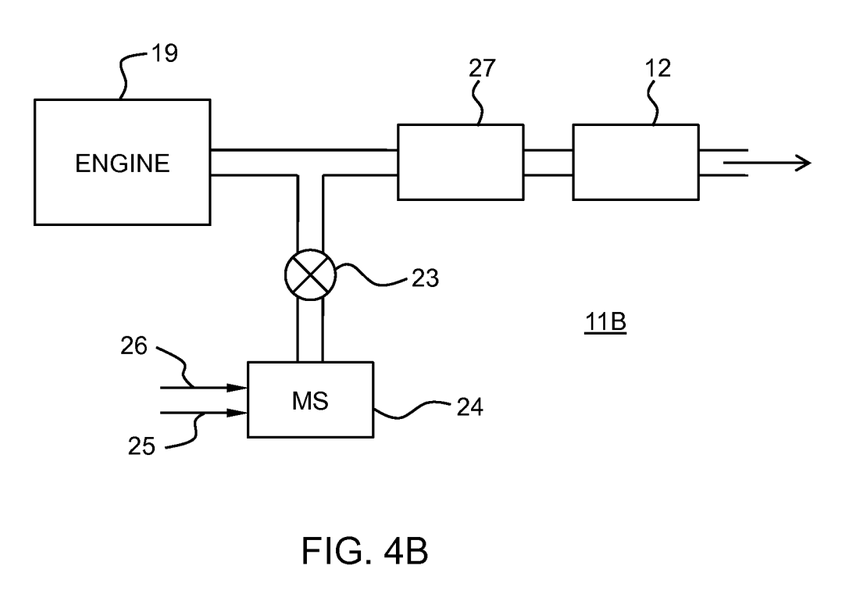

An alternative embodiment of the emissions treatment system, denoted as 11B is depicted in FIG. 4B which contains a second substrate 27 interposed between the $NH_3$ injector and the first substrate 12. In this embodiment, the second substrate is coated with an SCR catalyst composition which may be the same composition as is used to coat the first substrate 12 or a different composition. An advantageous feature of this embodiment is that the SCR catalyst compositions that are used to coat the substrate can be selected to optimize NOx conversion for the operating conditions characteristic of that site along the exhaust system. For example, the second substrate can be coated with an SCR catalyst composition that is better suited for higher operating temperatures experienced in upstream segments of the exhaust system, while another SCR composition can be used to coat the first substrate (i.e., the inlet zone of the first substrate) that is better suited to cooler exhaust temperature which are experienced in downstream segments of the exhaust system.

In the embodiment depicted in FIG. 4B, the second substrate 27 can either be a honeycomb flow through substrate, an open cell foam substrate or a honeycomb wall flow substrate. In configurations of this embodiment where the second substrate is a wall flow substrate or a high efficiency open cell foam filter, the system can remove greater than 80% of the particulate matter including the soot fraction and the SOF. An SCR-coated wall flow substrate and its utility in the reduction of NOx and particulate matter have been described, for instance, in co-pending U.S. patent application Ser. No. 10/634,659, filed Aug. 5, 2003, the disclosure of which is hereby incorporated by reference.

Figure 4C:
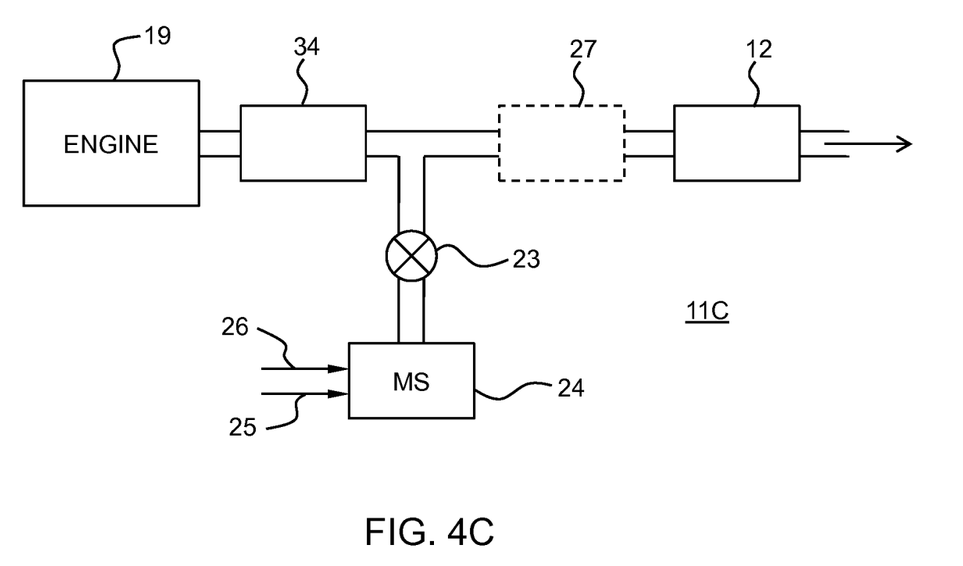

In some applications it may be advantageous to include an oxidation catalyst upstream of the site of ammonia/ammonia precursor injection. For instance, in the embodiment depicted in FIG. 4C an oxidation catalyst is disposed on a catalyst substrate 34. The emissions treatment system 11C is provided with the first substrate 12 and optionally includes a second substrate 27. In this embodiment, the exhaust stream is first conveyed to the catalyst substrate 34 where at least some of the gaseous hydrocarbons, CO and particulate matter are combusted to innocuous components. In addition, a significant fraction of the NO of the NOx component of the exhaust is converted to $NO_2$. Higher proportions of $NO_2$ in the NOx component facilitate the reduction of NOx to $N_2$ and $H_2O$ on the SCR catalyst(s) located downstream. It will be appreciated that in the embodiment shown in FIG. 10C, the first substrate 12 could be a catalyzed soot filter, and the SCR catalyst could be disposed on the catalyzed soot filter. In an alternative embodiment, the second substrate 27 comprising an SCR catalyst may be located upstream from catalyst substrate 34.

In systems that utilize an SCR catalytic article downstream of a diesel oxidation catalyst (DOC), the properties of the CHA zeolite catalyst disclosed herein may provide one or more beneficial results. During start-up and prolonged low temperature operation, the DOC or DOC and CSF upstream of a SCR catalyst are not fully activated to oxidize the hydrocarbons. Because the CHA zeolite SCR catalytic articles provided herein are not influenced by hydrocarbons at low temperature, it remains active over a wider range of the low temperature operation window. For example, and as discussed below, CuNatCHA and CuSynCHA catalytic articles display substantial NOx conversion at temperatures of 250° C. and below. Also, since oxidation catalysts lose their ability to oxidize NO to $NO_2$ over time, it is beneficial to provide an SCR catalyst that can treat NO as effectively as $NO_2$. As discussed below, both CuNatCHA and CuSynCHA catalytic articles are capable of reducing NO with $NH_3$, even at low temperatures.

Without intending to limit the invention in any manner, embodiments of the present invention will be more fully described by the following examples.

EXAMPLE 1

A K-Chabazite was prepared from an $Al_2O_3$:5.2 $SiO_2$:2 $K_2O$: 224 $H_2O$ gel composition. CBV500 (a Zeolite-Y product available from Zeolyst International, Conshohocken, Pa.) was first calcined in air at 540° C. for 4 hours to prepare the H-form. A reaction mixture was formed by combining 125 g of this calcined zeolite (H-CBV500) with a mixture of 134 g potassium hydroxide (45%) in 991 g of deionized water. The resulting gel was heated in a 2 liter autoclave at 95° C. for 6 days. The mixture was continuously stirred at 32 rpm. The crystalline product was recovered via filtration and was washed to a conductivity of 200 µS. The sample was dried at 90° C. The crystalline product had an X-ray powder diffraction pattern indicating that it was Chabazite.

An $NH_4^+$-form of Chabazite was prepared by exchanging 100 g of the K-Chabazite in a solution of ammonium nitrate (500 g 54 wt % ammonium nitrate mixed with 500 g of deionized water). The exchange was carried out by agitating the slurry at 80° C. for 1 hour, during which the pH was between 2.57 and 3.2. The solid was then filtered on a Buchner filter and washed until the filtrate had a conductivity lower than 200 µS. The powder was then dried for 16 hours before carrying out the above ammonium exchange process for a total of two exchanges. By XRF chemical analysis, the composition of the solids product was established to be 22.86 wt % $Al_2O_3$, 73.62 wt % $SiO_2$, and 3.52 wt % $K_2O$. The $SiO_2$:$Al_2O_3$ was calculated to be 5.5.

The $NH_4^+$-form was then calcined at 540° C. for 4 hours before carrying out the above ammonium exchange process another 2 times. By XRF chemical analysis, the composition of the solids product was established to be 23.69 wt % $Al_2O_3$, 76.25 wt % $SiO_2$, and 0.08 wt % $K_2O$. The $SiO_2$:$Al_2O_3$ was calculated to be 5.5.

A CuSynCHA powder catalyst was prepared by mixing 10 g of $NH_4^+$-form Chabazite, with 37 ml of a copper(II) sulfate solution of 1.0 M. An ion-exchange reaction between the $NH_4^+$-form Chabazite and the copper ions was carried out by agitating the slurry at 70° C. for 1 hour. The pH was between 2.9 and 3.2 during the reaction. The resulting mixture was then filtered and washed until the filtrate had a conductivity of <200 µS, which indicated that substantially no soluble or free copper remained in the sample. The washed sample was then dried at 90° C. The obtained Cu-Chabazite catalyst comprised CuO at 3.35% by weight, as determined by ICP analysis.

EXAMPLE 2

Catalyst performance for Example 1 was evaluated using a microchannel catalytic reactor containing a bed of approximately 12.6 mm³ of catalyst. The flow rate (standard temperature and pressure) of 25 cc/min of reactants (at the concentration shown in Table 1 below) plus 1.25 cc/min steam was passed over the bed at various temperatures (200, 250, 300, 350, 400, 450 and 500° C.) to determine the reactivity of the catalyst. Conversion of $NO_x$ was determined by 100*($NO_x$ fed—$NO_x$ out)/($NO_x$ fed) using a mass spectral analyzer.

TABLE 1

| Species | Concentration |
|---|---|
| $NO_x$ | 500 ppm |
| NH3 | 500 ppm |
| $O_2$ | 10% |
| He | balance |
| $H_2O$ as % of dry gas flow | 5% |

Catalysts were aged using 10% steam in air at 700° C. for 50 hours.

Figure 1:
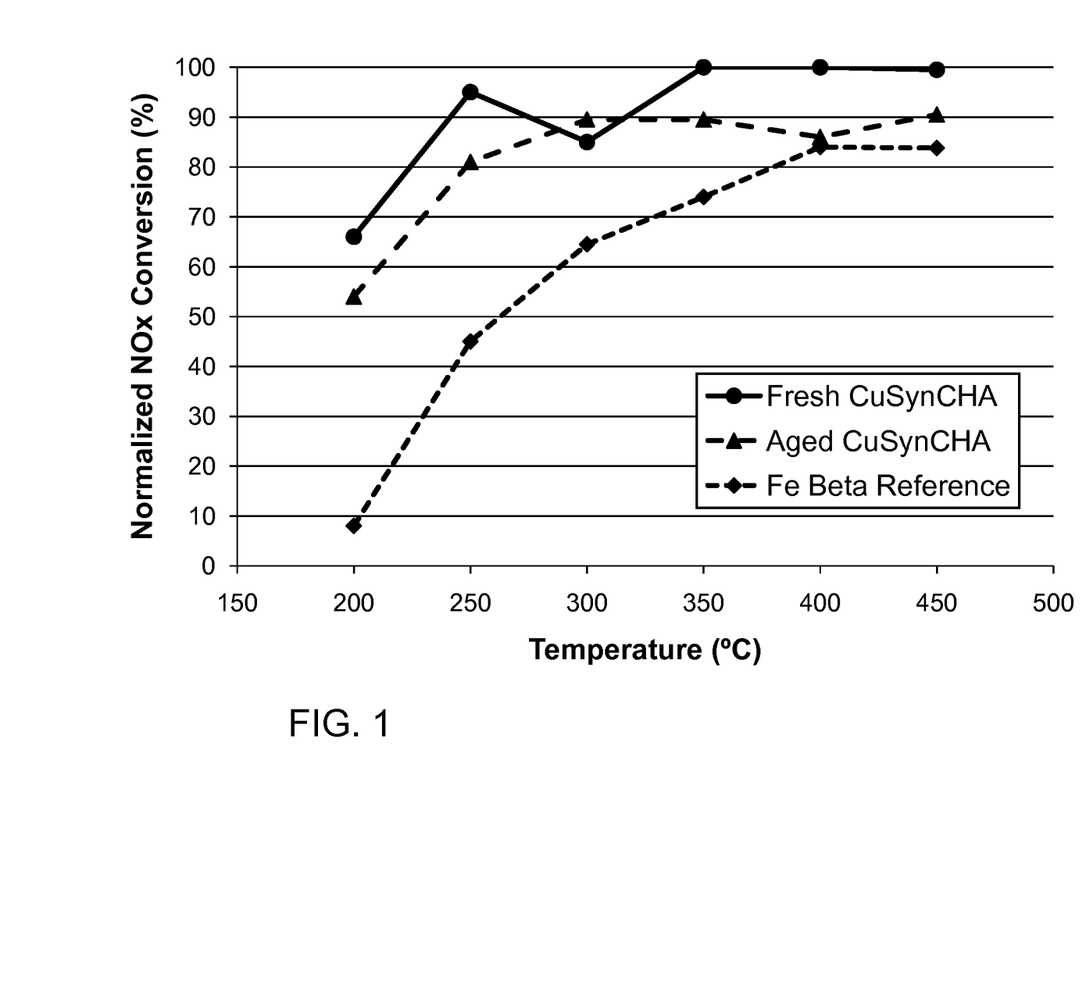
FIG. 1 is a graph depicting normalized data for NOx conversion (%) versus temperature for fresh and aged CuSynCHA SCR catalytic articles made in accordance with the present invention compared to a Fe-Beta SCR catalytic article.

FIG. 1 shows normalized data for nitrogen oxides removal efficiency (%) for the fresh and aged CuSynCHA catalyst as a function of temperature generated on a microchannel catalytic reactor. As can be seen from FIG. 1, the CuSynCHA catalyst has improved NOx conversion in comparison to the standard Fe-Beta technology, and also exhibits high hydrothermal stability.

EXAMPLE 3

Sedimentary Chabazite was obtained from the deposit at Bowie, Ariz. from GSA Resources of Tuscan, Ariz. This material is high purity natural Chabazite.

An $NH_4^+$-form of Chabazite was prepared by exchanging 350 g of the K-Chabazite in a solution of ammonium nitrate (1750 g 54 wt % ammonium nitrate mixed with 1750 g of deionized water). The exchange was carried out by agitating the slurry at 80° C. for 1 hour, during which the pH was between 2.57 and 3.2. The solid was then filtered on a Buchner filter and washed until the filtrate had a conductivity lower than 200 µS. The powder was then dried for 16 hours before carrying out the above ammonium exchange process for a total of two exchanges. By XRF chemical analysis, the composition of the solids product was established to be 19.75 wt % $Al_2O_3$, 79.85 wt % $SiO_2$, and 0.4 wt % $K_2O$. The $SiO_2$:$Al_2O_3$ was calculated to be 6.86.

The $NH_4^+$-form was then calcined at 540° C. for 4 hours before carrying out the above ammonium exchange process another 2 times. By XRF chemical analysis, the composition of the solids product was established to be 18.92 wt % $Al_2O_3$, 80.9 wt % $SiO_2$, and 0.17 wt % $K_2O$. The $SiO_2$:$Al_2O_3$ was calculated to be 7.26.

A CuNatCHA powder catalyst was prepared by mixing 230 g of $NH_4^+$-form Chabazite, with 860 ml of a copper (II) acetate solution of 0.5 M. An ion-exchange reaction between the $NH_4^+$-form Chabazite and the copper ions was carried out by agitating the slurry at 70° C. for 1 hour. The pH was between 3.8 and 4.2 during the reaction. The resulting mixture was then filtered and washed until the filtrate had a conductivity of <200 µS, which indicated that substantially no soluble or free copper remained in the sample. The washed sample was then dried at 90° C. The obtained CuNatCHA catalyst comprised CuO at 7% by weight, as determined by ICP analysis.

A CuNatCHA slurry was prepared by mixing 90 g of Cu-Chabazite, as described above, with 215 mL of deionized water. The mixture was ball-milled for 4 hours to obtain a slurry which comprised 90% particles smaller than 10 µm. 15.8 g of zirconium acetate in dilute acetic acid (containing 30% $ZrO_2$) was added into the slurry with agitation.

The slurry was coated onto 1"D×3"L cellular ceramic cores, having a cell density of 400 cpsi (cells per square inch) and a wall thickness of 6.5 mil. The coated cores were dried at 110° C. for 3 hours and calcined at 400° C. for 1 hour. The coating process was repeated once to obtain a target washcoat loading of 2.4 g/in³.

EXAMPLE 4

Nitrogen oxides selective catalytic reduction (SCR) efficiency and selectivity of a fresh catalyst core was measured by adding a feed gas mixture of 500 ppm of NO, 500 ppm of $NH_3$, 10% $O_2$, 5% $H_2O$, balanced with $N_2$ to a steady state reactor containing a 1"D×3"L catalyst core from Example 3. The reaction was carried at a space velocity of 80,000 hr$^{-1}$ across a 150° C. to 460° C. temperature range.

Hydrothermal stability of the catalyst was measured by hydrothermal aging of the catalyst core in the presence of 10% $H_2O$ at, 750° C. for 25 hours, followed by measurement of the nitrogen oxides SCR efficiency and selectivity by the same process as outlined above for the SCR evaluation on a fresh catalyst core.

Figure 2:
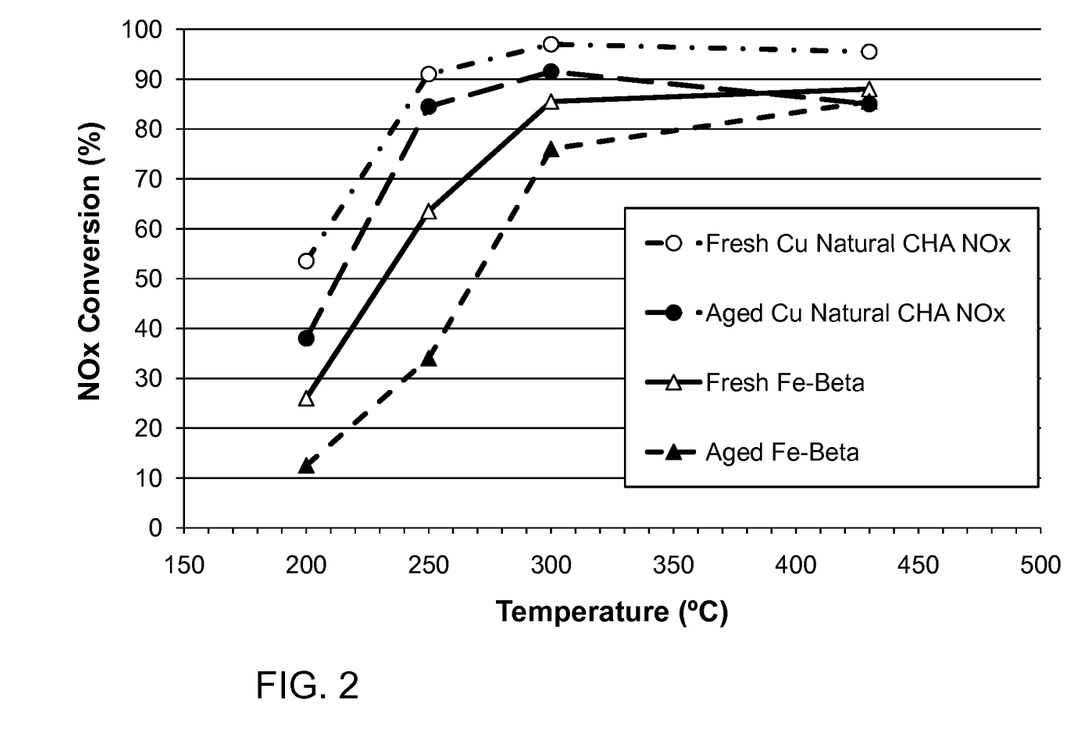
FIG. 2 is graph depicting NOx conversion (%) versus temperature for fresh and aged CuNatCHA SCR catalytic articles made in accordance with embodiments of the present invention compared to fresh and aged Fe-Beta SCR catalytic articles.

FIG. 2 is graph showing the NOx conversion versus temperature for the fresh and aged CuNatCHA catalyst compared to the current state of the art Fe-Beta catalyst. As can be seen from FIG. 2, the CuSynCHA catalyst has improved low temperature NOx conversion and greater hydrothermal stability in comparison to the standard Fe-Beta technology.

Figure 3:
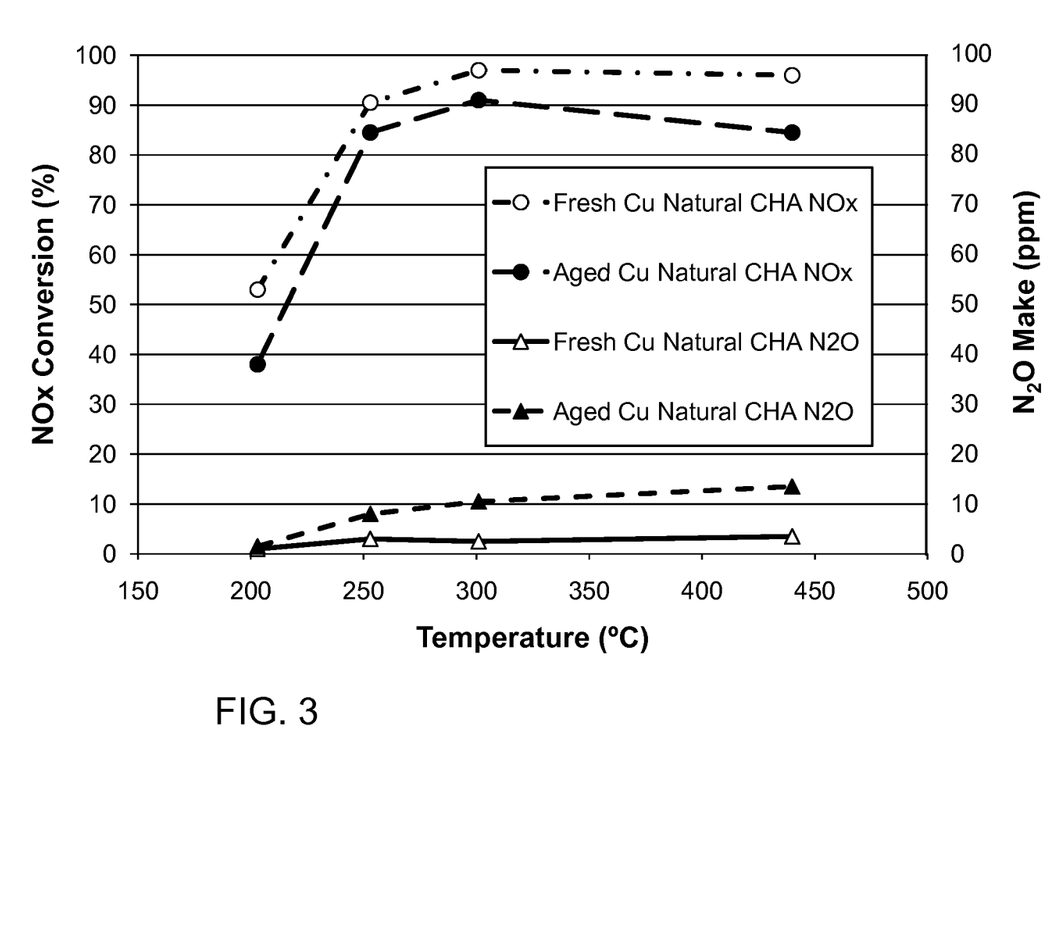
FIG. 3 is graph depicting NOx conversion and $N_2O$ make versus temperature for fresh and aged CuNatCHA SCR catalytic articles made in accordance with embodiments of the present invention.

FIG. 3 is graph showing a comparison of the NOx conversion and $N_2O$ make or formation versus temperature for the fresh and aged CuNatCHA catalyst. As can be seen from FIG. 3, the CuSynCHA catalyst has high selectivity for NOx conversion with low production of undesired $N_2O$. After aging, the maximum $N_2O$ make was 14 ppm at 450° C.

COMPARATIVE EXAMPLE 1

A K-Chabazite was prepared as described in example 1.

An $NH_4^+$-form of Chabazite was prepared using the same experimental conditions described in Example 1. That is, exchanging 100 g of the K-Chabazite in a solution of ammonium nitrate (500 g 54 wt % ammonium nitrate mixed with 500 g of deionized water). The exchange was carried out by agitating the slurry at 80° C. for 1 hour, during which the pH was between 2.57 and 3.2. The solid was then filtered on a Buchner filter and washed until the filtrate had a conductivity lower than 200 µS. The powder was then dried for 16 hours. This ion-exchange was repeated to give a total of 6 ammonium exchanges and chemical analysis is recorded after each experiment in Table 1. No intermediate calcination step occurred between ammonium exchanges. This example shows that an intermediate calcination is useful to enable the removal of potassium to values lower than ~1.72 wt %.

TABLE 1

| Number of ammonium ion-exchange steps | $K_2O$ loading in zeolite (wt %) |
|---|---|
| 1 | 9.92 |
| 2 | 5.83 |
| 3 | 3.96 |
| 4 | 2.89 |
| 5 | 2.39 |
| 6 | 1.72 |

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

What is claimed is:

1. A selective catalytic reduction catalytic article comprising a natural or synthetic aluminosilicate zeolite, the zeolite having exchange sites and a CHA crystal structure and the zeolite promoted at the exchange sites with one or more metal cations selected from iron, copper and combinations thereof, the zeolite being disposed on a substrate, the article effective to reduce NOx in exhaust streams from diesel and gasoline engines, wherein the zeolite has a mole ratio of silica to alumina of less than 15 and has an alkali content of less than about 0.5 weight percent, wherein the catalytic article exhibits the selective catalytic reduction of NOx with ammonia exceeding at least about 50% in exhaust gas streams at 250° C., and wherein the catalytic article further comprises a second zeolite having the CHA crystal structure and a mole ratio of silica to alumina from about 15 to about 256 and the atomic ratio of copper to aluminum is from about 0.25 to about 0.50, the zeolite and the second zeolite in a mixture.

2. The catalytic article of claim 1, wherein the zeolite comprises a non-synthetic, naturally occurring zeolite.

3. The catalytic article of claim 1, wherein the zeolite has a mole ratio of silica to alumina of less than about 10.

4. The catalytic article of claim 1, wherein the metal cation is copper.

5. The catalytic article of claim 4, wherein the catalytic article exhibits NOx conversion performance at between about 200° C. and 450° C. following hydrothermal aging at 700° C. in 10% steam in air for 25-50 hours that is at least about 80% of NOx conversion performance of the catalytic article at between about 200° C. and 450° C. prior to aging and $N_2O$ formation that is less than about 15 ppm at 450° C. following aging at 700° C. in 10% steam in air for 25 hours.

6. The catalytic article of claim 1, wherein the zeolite comprises a synthetic zeolite.

7. The catalytic article of claim 1, wherein the substrate is a soot filter.

8. The catalytic article of claim 7, wherein the soot filter comprises a wall flow substrate.

9. An exhaust gas treatment system comprising the catalytic article of claim 8.

10. The exhaust gas treatment system of claim 9, further comprising an oxidation catalyst upstream of and in fluid communication with the catalytic article.

11. The exhaust gas treatment system of claim 9, further comprising an oxidation catalyst upstream of the catalytic article and a catalyzed soot filter upstream of the catalytic article.

12. The catalytic article of claim 1, wherein the substrate comprises a honeycomb flow through substrate.

13. An exhaust gas treatment system comprising the catalytic article of claim 12.

14. The exhaust gas treatment system of claim 13, further comprising an ammonia oxidation catalyst downstream of and in fluid communication with the catalytic article.

15. The exhaust gas treatment system of claim 14, wherein both the catalytic article and the ammonia oxidation catalyst comprise a zeolite having a CHA crystal structure having a mole ratio of silica to alumina of less than 15.

16. The catalytic article of claim 1, wherein the zeolite is prepared by a process comprising mixing an alumina source, a silica source and sources of one or more of sodium and potassium to form an aqueous gel, and crystallizing the gel by heating to form the zeolite.

17. The catalytic article of claim 16, comprising one or more of KOH and NaOH.

18. A process for reducing NOx in a gas stream comprising contacting the gas stream with the catalytic article of claim 1.

19. A method of making the catalytic article of claim 1 comprising:
ion exchanging an alkali form of a zeolite having the CHA crystal structure containing an initial alkali content with a solution to reduce the alkali content;

calcining the ion exchanged zeolite with the reduced alkali content to provide a calcined zeolite;

subsequently ion exchanging the calcined zeolite with a solution to further reduce the alkali content to provide the zeolite having a mole ratio of silica to alumina of less than 15 and an alkali content of less than about 0.5 weight percent.

20. The method of claim 19, wherein the solution is an ammonium salt solution.

21. The method of claim 20, wherein the calcining occurs at a temperature of at least about 350° C. for at least about one hour.

22. The method of claim 21, further comprising conducting a metal ion exchange with an iron or copper solution to provide a metal promoted zeolite.

* * * * *

UNITED STATES PATENT AND TRADEMARK OFFICE
CERTIFICATE OF CORRECTION

PATENT NO.        : 10,583,424 B2
APPLICATION NO.   : 12/612142
DATED             : March 10, 2020
INVENTOR(S)       : Ivor Bull, Ahmad Moini and Mukta Rai Page 1 of 1

It is certified that error appears in the above-identified patent and that said Letters Patent is hereby corrected as shown below:

In page 3, Column 1, item (56), other publications, cite no. 7, delete:
"Chen, Jiesheng et al., "Silicoaluminophosphate NO eighteen (SAPO-18): a new mircoporous solid acid catalyst", Catalysis Letters 28, (1994), 241-248"
And insert:
-- Chen, Jiesheng et al., "Silicoaluminophosphate number eighteen (SAPO-18): a new mircoporous solid acid catalyst", Catalysis Letters 28, (1994), 241-248 --, therefor.

Signed and Sealed this
Twenty-third Day of March, 2021

Drew Hirshfeld
*Performing the Functions and Duties of the
Under Secretary of Commerce for Intellectual Property and
Director of the United States Patent and Trademark Office*